US009860818B2

United States Patent
Tapia

(10) Patent No.: US 9,860,818 B2
(45) Date of Patent: Jan. 2, 2018

(54) RESOURCE ALLOCATION FOR SELF-ORGANIZING NETWORKS

(71) Applicant: T-Mobile USA, Inc., Bellevue, WA (US)

(72) Inventor: Pablo Tapia, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 104 days.

(21) Appl. No.: 14/255,859

(22) Filed: Apr. 17, 2014

(65) Prior Publication Data

US 2015/0305045 A1     Oct. 22, 2015

(51) Int. Cl.
| | |
|---|---|
| H04W 36/36 | (2009.01) |
| H04W 72/08 | (2009.01) |
| H04W 84/18 | (2009.01) |
| H04W 24/02 | (2009.01) |
| H04W 72/04 | (2009.01) |

(52) U.S. Cl.
CPC ....... *H04W 36/365* (2013.01); *H04W 72/087* (2013.01); *H04W 84/18* (2013.01); *H04W 24/02* (2013.01); *H04W 72/0453* (2013.01)

(58) Field of Classification Search
CPC ............ H04W 72/0493; H04W 72/08; H04W 36/365; H04W 72/087; H04W 24/02; H04W 72/0453; H04W 84/18
See application file for complete search history.

(56) References Cited

U.S. PATENT DOCUMENTS

| | | | | |
|---|---|---|---|---|
| 6,038,444 A | * | 3/2000 | Schipper | ............ H04B 7/18541 455/421 |
| 2010/0299419 A1 | | 11/2010 | Ramankutty et al. | |
| 2012/0157144 A1 | | 6/2012 | Stanforth et al. | |
| 2013/0201959 A1 | * | 8/2013 | Guo | ............... H04W 52/40 370/331 |
| 2013/0301609 A1 | * | 11/2013 | Smith | ............... H04W 72/0493 370/331 |
| 2013/0331079 A1 | | 12/2013 | Racz et al. | |
| 2013/0343212 A1 | | 12/2013 | Sedlar et al. | |
| 2014/0092765 A1 | | 4/2014 | Agarwal et al. | |

(Continued)

FOREIGN PATENT DOCUMENTS

WO     WO2012142172     10/2012

OTHER PUBLICATIONS

The PCT Search Report and Written Opinion dated Jul. 22, 2015 for PCT application No. PCT/US2015/025684, 12 pages.

(Continued)

*Primary Examiner* — Kwang B Yao
*Assistant Examiner* — Moo Ryong Jeong
(74) *Attorney, Agent, or Firm* — Lee & Hayes, PLLC

(57) ABSTRACT

A self-organizing network includes one or more tools. Such tools may be configured to determine, based on one or more performance indicators, that network usage in a first portion of a frequency spectrum satisfies a first usage threshold of the first portion. Such tools may also be configured to transition, in response to the determining, the plurality of users from the first portion to a second portion of the frequency spectrum different from the first portion. Such tools may further be configured to hinder the plurality of users from returning to the first portion from the second portion.

20 Claims, 4 Drawing Sheets

(56) References Cited

U.S. PATENT DOCUMENTS

2014/0293979 A1* 10/2014 Gormley .............. H04W 24/02
370/338

OTHER PUBLICATIONS

Extended European Search Report dated Nov. 6, 2017 for European patent application No. 15779917.2, 9 pages.
Stevenson et al., "IEEE P802.22: Functional Requirements for the 802.22 WRAN Standard," IEEE Mentor, Sep. 29, 2005, retrieved from the internet on May 16, 2012 at URL:http://www.ieee802.org/22/, 50 pages.

* cited by examiner

RESOURCE ALLOCATION FOR SELF-ORGANIZING NETWORKS

BACKGROUND

Self-Organizing Networks (SON) are networks capable of any or all of automatic self-configuration, self-optimization, or self-healing. Recent developments of SON have centered on radio access networks, but any sort of network may be developed into an SON, such as a smart energy grid system or a medical health system. For radio access networks, such as telecommunication networks, self-configuration may include use of "plug-and-play" techniques for automatically configuring and integrating base stations and/or other components of the networks. Self-optimization includes automatic adjustments of base station parameters based on performance indicators. Self-healing may also involve automatic adjustments of base station parameters. For instance, a neighboring base station may be automatically re-configured to support users of a failed base station.

Tools have been developed for radio access networks implementing SON technologies. Such tools may include performance management tools, radio frequency (RF) planning tools, automatic frequency planning tools, rehoming tools, or automatic cell planning tools. Each of these tools is entirely self-contained and handles everything from interfacing directly with network components to retrieve measurements and configure parameters, to smart analysis of and decisions regarding measurements and configurations, to presentation of users of relevant information.

Due to increases in network usage by various users, SON bandwidth in some frequencies can occasionally become constrained. For example, while network users may obtain network access across a wide range of frequencies, certain frequency ranges are typically designated for periodic use by public service entities. When such entities begin using a particular frequency range, bandwidth within the particular frequency range may be reduced, thereby causing an increase in congestion within the frequency range and reduced user satisfaction. Regardless of the source of or the reason for such congestion, there is a need for a mechanism to ensure unimpeded use of the designated frequency ranges by public service entities once such entities begin using one of the frequency ranges.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 also illustrates a plurality of users connected to the SON and a public service user intermittently connected to the SON.

DETAILED DESCRIPTION

This disclosure describes, in part, an API for SONs that is common to at least a plurality of SON tools of a specific SON. The API enables multiple SON components to each focus on a purpose (e.g., data consolidation, visualization, etc.) while communicating with each other to accomplish an overall SON plan. Thus, one component may gather network information and determine performance indicators and another may receive updated network configurations and configure network components, and a SON tool may receive performance indicators and provide updated network configurations to those components using the API or perform at least one action based on the performance indicators. The SON tool may also or instead be triggered by another SON component and perform an action, such as restoring a parameter to a specific value following a parameter consistency check, without respect to the performance indictors.

Additionally, the SON tools may be configured to utilize the performance indicators to generate updated network configurations, and to configure or re-configure a base station or other network components with the updated configurations. For example, one or more of the performance indicators may be indicative of network congestion, network resource allocation, network bandwidth, and/or other metrics indicative of network usage within a particular frequency range. The particular frequency range may be a frequency range designated for use by public service entities but in which use by other users is also permitted. In situations where such indicators are indicative of network usage satisfying a network usage threshold or usage model, the SON tools may generate an updated network configuration in which a plurality of users registered within the particular frequency range are transitioned to a different frequency range in order to improve network performance. Additionally, in some embodiments the updated network configuration may hinder the plurality of users from returning to the particular frequency range.

Overview

Figure 1:
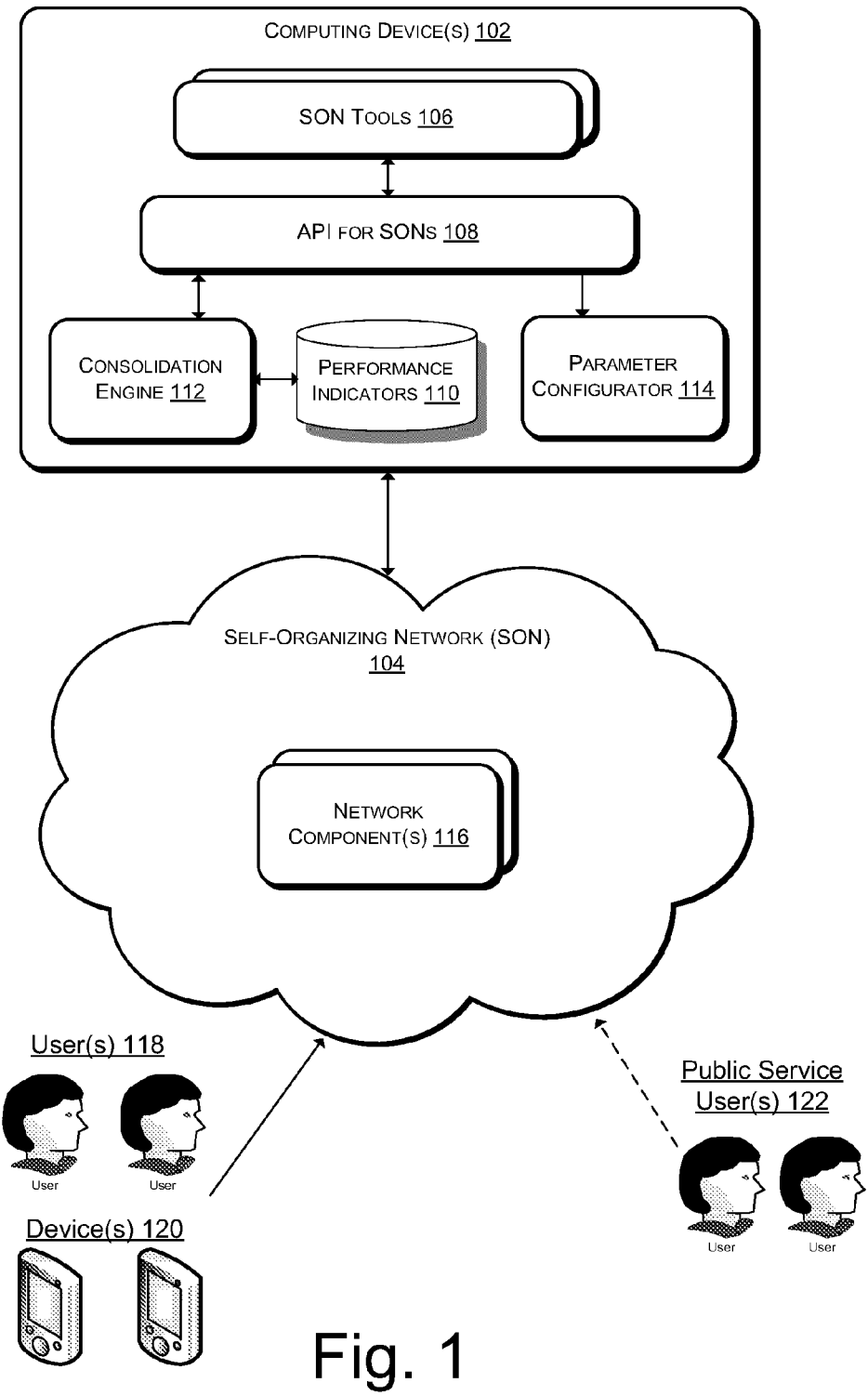
FIG. 1 illustrates an overview of a SON with an application programming interface (API) common to a plurality of SON tools, the SON tools receiving performance indicators via the API and performing at least one action based on the performance indicators.

FIG. 1 illustrates an overview of a SON with an application programming interface (API) common to a plurality of SON tools, the SON tools receiving performance indicators via the API and performing at least one action based on the performance indicators. Such actions may include, for example, determining, based on the one or more performance indicators, that network usage in a first portion of a frequency spectrum in which the SON is operating satisfies a first usage threshold of the first portion, and transitioning, in response to the determining, a plurality of users from the first portion of the frequency spectrum to a second portion of the frequency spectrum different from the first portion. Such actions may also include hindering the plurality of users from returning to the first portion of the frequency spectrum from the second portion of the frequency spectrum. In example embodiments of the present disclosure, the various portions of the frequency spectrum described herein may comprise one or more frequency ranges, frequency bands, frequency channels, or the like. For ease of description, SON users will be described as being transitioned between various frequency ranges of the frequency spectrum in which the SON is operating unless otherwise specified. Additionally, it is understood that such a frequency spectrum may comprise a frequency band (such as, for example, 3GPP Band I, Band II, etc.) or a frequency channel (such as, for example, UARFCN 1887).

As illustrated, one or more computing devices 102 associated with a SON 104 may be configured with SON tools 106 that utilize an API for SONs 108 which is common to the multiple SON tools 106. The SON tools 106 receive performance indicators 110 associated with network information via the API 108. In an example embodiment, one or more of the performance indicators 110 may be determined by a consolidation engine 112. Alternatively, one or more of the performance indicators 110 may be determined by other SON tools 106. The SON tools 106 perform at least one action based on the performance indicators 110, such as generating updated network configurations based on the performance indicators 110 and providing the updated network configurations via the API 108 to a parameter configurator 114. The parameter configurator 114 then configures one or more network components 116 of the SON 104 by, for example, updating parameters of the network component(s) 116. For example, the parameter configurator 114 may configure or re-configure a base station of the SON 104 with an updated network configuration that transitions a plurality of network users 118 from a first portion of the frequency spectrum on which the SON 104 is operating to a second portion of the frequency spectrum different from the first portion. In such an example, the base station and/or the parameter configurator 114 may push the updated network configuration down to user devices 120 registered on the SON 104 within the first portion to improve network performance. For example, in embodiments in which one or more public service users 122 registers on the SON 104 within the first portion of the frequency spectrum, the base station and/or other network components 116 may transition (i.e., "handover") a plurality of users 118 from the first portion of the frequency spectrum to a second portion of the spectrum. In such embodiments, the first portion of the frequency spectrum may comprise, for example, the 700 MHz Band. The 700 MHz Band may comprise 108 megahertz of spectrum from 698-806 MHz and may be designated for commercial and public safety uses. The second portion of the frequency spectrum may, on the other hand, comprise any spectrum band outside of, for example, the 700 MHz Band. In further example embodiments, the second portion may comprise an additional frequency channel within the 700 MHz Band that is not designated for public safety uses.

Figure 3:
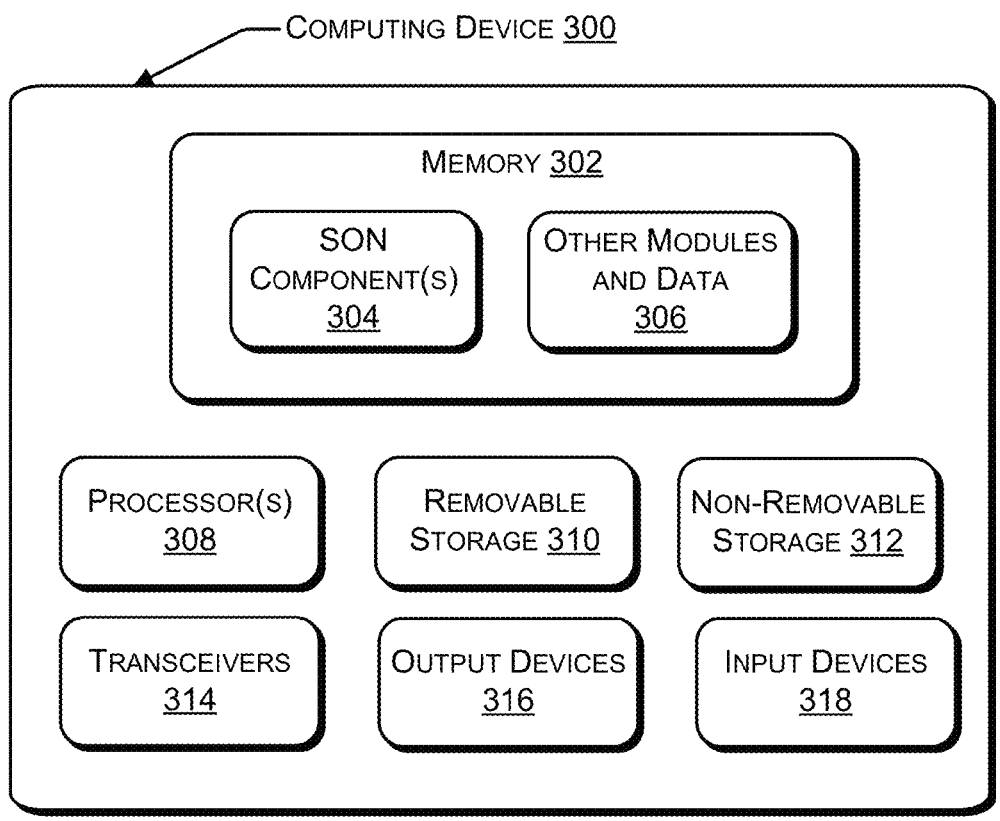
FIG. 3 illustrates a component level view of a computing device configured to implement one or more SON components.

In various embodiments, the computing device(s) 102 may each be or include a server or server farm, multiple, distributed server farms, a mainframe, a work station, a personal computer (PC), a laptop computer, a tablet computer, an embedded system, or any other sort of device or devices. In one implementation, the computing device(s) 102 represent a plurality of computing devices working in communication, such as a cloud computing network of nodes. The computing device(s) 102 may belong to the SON 104 or may be external to but in communication with the SON 104. An example computing device 102 is illustrated in FIG. 3 and is described in detail below with reference to that figure. Additionally, similar to the computing device(s) 102, one or more of the user devices 120 may comprise a personal computer (PC), a laptop computer, a tablet computer, a cellular phone, or any other sort of device.

The SON 104 may be any sort of network configured by SON components to perform at least one of self-configuring, self-optimizing, or self-healing. Such SON components are illustrated in FIG. 1 by elements 106-114. For example, the SON 104 may be a radio access network, such as a telecommunication network. The network component(s) 116 of the SON 104 may be subnetworks, devices, or modules capable of being initialized or configured by the SON components 106-114. For example, when the SON 104 is a telecommunication network, such as a 2G, 3G, or 4G/LTE network, the network component(s) 116 may be base stations (e.g., Node Bs or eNode Bs), radio network controllers (RNCs), an operations support system (OSS), a word order system, or other network element(s). Information about the SON 104 (referred to herein as "network information"), such as measurements or parameters, may also be provided by the network component(s) 116, or may instead be provided by other sources within the SON 104. In example embodiments, such network information may include bandwidth measurements, interference measurements, power utilization measurements, resource allocation data, and/or other information indicative of network usage within one or more portions of the frequency spectrum in which the SON 104 is operating. The network information may be provided by any or all of a trouble ticket system, radio traces, core network traces, from an OSS, or from one or more other network elements. Depending on the purpose(s) of the SON 104 (e.g., telecommunications), the SON 104 may include any number of different subnetworks, devices, and modules specific to the purpose(s) of the SON 104 and may be in communication with any number of devices external to the SON 104.

In some embodiments, the consolidation engine 112 may be a SON component whose purpose is to receive or retrieve network information and to determine performance indicators 110 based on that network information. The consolidation engine 112 may have ongoing, periodic, or event-driven connections to sources of network information of the SON 104, and the consolidation engine 112 receives or retrieves the network information via those connections.

Upon receiving the network information, the consolidation engine 112 utilizes a store of performance indicators 110, such as key performance indicators, associated with the API 108 to determine new/updated performance indicators 110. The store of performance indicators 110 may be any sort of database, file, or data structure. Also, the store of performance indicators 110 may be associated with a schema, and the schema may be extended, along with the API 108, in response to the addition of new SON tools 106. Based on the schema, the stored performance indicators 110, and the received or retrieved network information, the consolidation engine 112 determines new/updated performance indicators 110 and stores those new/updated performance indicators 110 in the store of performance indicators 110. New performance indicators 110 may be generated by the consolidation engine 112 responsive to a request to generate a performance indicator 110 that was received by the consolidation engine 112 from a SON tool 106. Alternatively, the consolidation engine 112 may monitor network usage continuously, substantially continuously, and/or on an interval basis. In further embodiments, performance indicators 110 may be generated upon registration of a public service user 122 within one or more frequency ranges or other portions of the frequency spectrum in which the SON 104 is operating. In such embodiments, registration of a public service use 122 may trigger generation of a performance indicator 110 indicative of network usage. In some embodiments, the consolidation engine 112 and/or other SON tools 106 may compare the performance indicator 110 to a usage threshold of the particular portion of the frequency spectrum. Such a usage threshold may comprise, for example, a maximum usage threshold, a bandwidth threshold, or other like limitation associated with the portion of the frequency spectrum in question. For example, in response to determining, based on the one or more performance indicators, that network usage in a first frequency range satisfies such a usage threshold of a first frequency range, the SON tools 106 may generate an updated network configuration operative to transition a plurality of users 120 to a second frequency range. In such an embodiment, the public service users 122 may remain in the first frequency range (i.e., within the 700 MHz Band and/or within the current frequency channel).

The consolidation engine 112 may automatically provide the determined performance indicators 110 to one or more of the SON tools 106 by utilizing the API 108 to invoke the one or more SON tools 106. The SON tools 106 invoked may be a function of which performance indicators 110 have been added or updated. In other embodiments, rather than automatically invoking SON tools 106, the consolidation engine 112 may be queried for performance indicators 110 by the SON tools 106 via the API 108.

In various embodiments, the API 108 is an API for SONs that may be standardized and shared among multiple SONs. When standardized, the API 108 may expose at least one of standardized methods/procedures or standardized parameters, such as performance indicators 110. In other embodiments, the architecture utilizing the API 108 may be standardized among multiple SONs, but the API 108 may be specific to the SON 104, including methods/procedures and parameters/performance indicators 110 that are specific to the SON tools 106. For example, a SON tool 106 may have a method to invoke that SON tool 106 to generate an updated network configuration, and the method may be associated with specific performance indicators 110 that are to be provided when calling the method. Such a method may be part of the API 108. Likewise, the consolidation engine 112 may provide a query method for retrieving performance indicators 110, the query method having as parameters the identifiers of the performance indicators 110 being sought by the query. Such a query method may also be part of the API 108. In addition, the API 108 may include methods for providing data to or for receiving or retrieving data from any of the SON components 106-114. In some embodiments, the API 108 may include methods for alerts or alarms that may be utilized by the SON tools 106 to receive notifications that, for example, a performance indicator 110 exceeds a usage threshold associated with a particular portion of the frequency spectrum. Also, while the API 108 is illustrated as a separate SON component, it is to be understood that the methods/processes associated with the API 108 are methods/processes of the other SON components 106 and 110-114 and that API 108 may simply be a logical representation, not a separate module of code or hardware device.

In some embodiments, the SON tools 106 may each be responsible for performing some task associated with self-configuration, self-optimization, or self-healing of the SON 104 resulting, for example, in the generation of an updated network configuration by that SON tool 106. As noted herein, such an updated network configuration may be employed to transfer one or more users 118 from a first portion of the frequency spectrum on which the SON 104 is operating to a second portion of the frequency spectrum different from the first portion. As noted above, such portions of the frequency spectrum may comprise one or more frequency bands, frequency channels, frequency ranges, or the like. The SON tools 106 may also each invoke, via the API 108, a SON component 116 to perform an action based on the performance indicators 110, invoke, via the API 108, an engineering tool based on the performance indicators 110, pass, via the API 108, information associated with the performance indicators 110 to a SON component 116, sending, via the API 108, a notification associated with the performance indicators 110, or generate a report based on the performance indicators 110.

The updated network configuration may simply be an update to a single parameter of a single network component 116 or may represent a more comprehensive configuration of multiple parameters of multiple network components 116. A SON tool 106 may be invoked by the consolidation engine 112 and receive performance indicators 110 or may invoke a query method of the API 108 associated with the consolidation engine 112 to receive or retrieve performance indicators 110. A SON tool 106 may also be invoked by another SON tool 106 through the API 108, and those SON tools 106 may collaborate.

Using the performance indicators 110, the SON tool 106 may generate an updated network configuration and invoke a method of the API 108 associated with the parameter configurator 114 to provide the parameter configurator with the updated network configuration. For example, the SON tool 106 may be a network congestion tool and may receive a performance indicator 110 indicative of network usage. The SON tool 106 may determine, based on the received performance indicator 110, that network usage within a particular portion of the frequency spectrum, such as the 700 MHz Band, exceeds or otherwise satisfies one of the usage thresholds described above associated with the particular portion of the frequency spectrum. In response, the SON tool 106 may generate an updated network configuration which reassigns and/or otherwise transitions a plurality of users 118 currently registered in the particular portion of the frequency spectrum to a different portion of the frequency spectrum. The SON tool 106 may then provide the updated network configuration to the parameter configurator 114, which may configure one or more base stations of the SON 104 with the updated network configuration to affect transitioning the users 118 to the different portion of the frequency spectrum.

Examples of SON tools 106 may further include any or all of an automated report generating tool, a parameter consistency check tool, a real-time alert tool, a mobility evaluation tool, a coverage and interference management tool, a network outage tool, a network configuration tool, a load distribution tool, a spectrum carving tool, or a special events tool. Additionally or instead, the SON tools 106 may include any or all of a performance management tool, a radio frequency (RF) planning tool, an automatic frequency planning tool, a rehoming tool, an automatic cellular planning tool, or a geolocation tool.

In some embodiments, SON tools 106 may perform actions without respect to performance indicators 110. The SON tools 106 may be triggered by other SON components and may perform an action, such as resetting a parameter, without needing to receive or retrieve performance indicators 110.

In various embodiments, the parameter configurator 114 may be invoked by a SON tool 106 and provided, via the API 108, with an updated network configuration. Alternatively, the parameter configurator 114 may invoke a SON tool 106 to retrieve an already prepared, updated network configuration or to have the SON tool 106 generate and provide an updated network configuration. Upon retrieving or receiving the updated network configuration, the parameter configurator 114 configures one or more network components 116 with the updated network configuration. As mentioned above, this may involve adjusting one or more parameters or network component(s) 116, such as one or more base stations of the SON 104. Example network component(s) 116 are described above in further detail.

Example Environment

Figure 2:
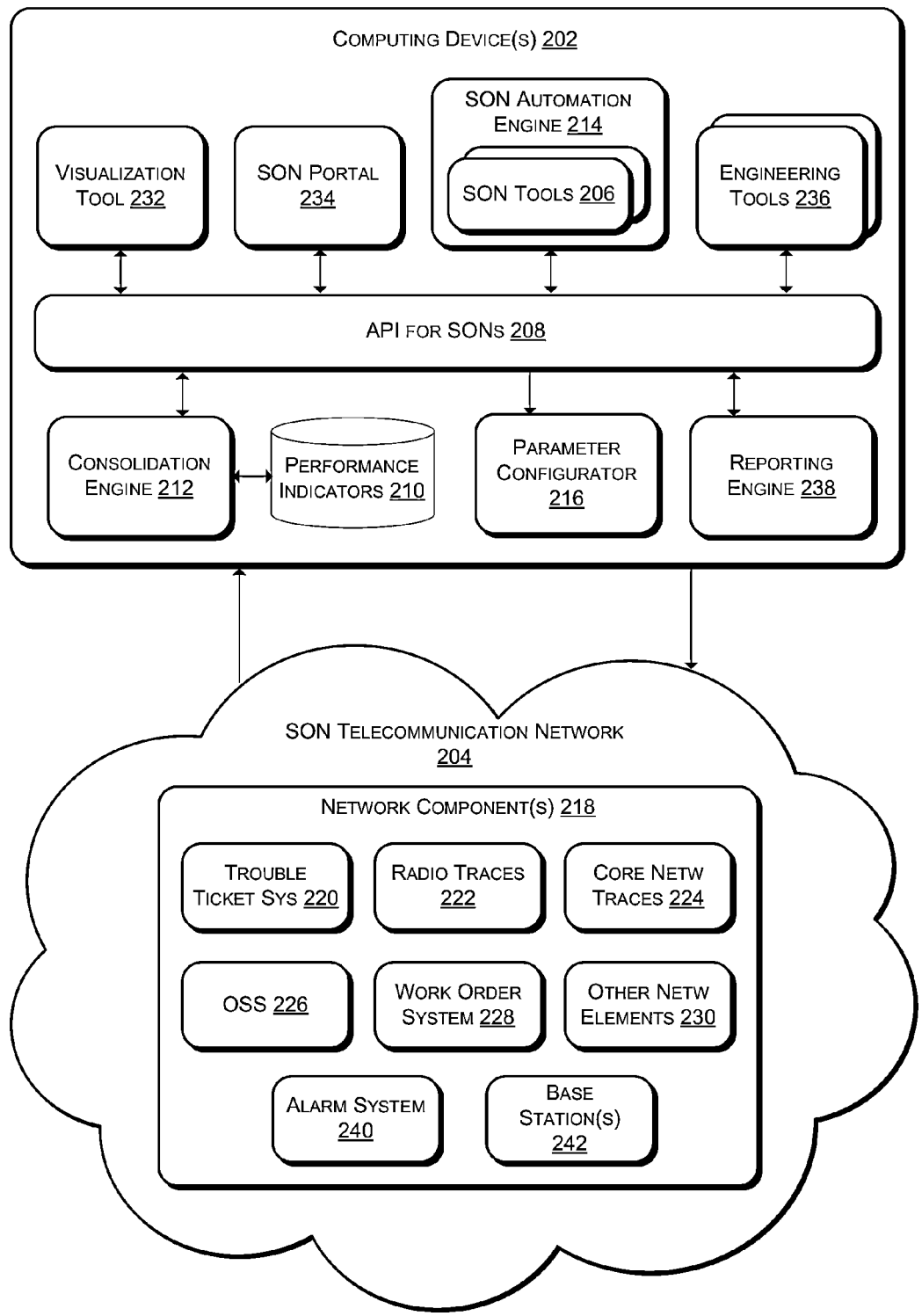
FIG. 2 illustrates an example environment including multiple SON components for a telecommunication network, the multiple SON components sharing a common API and each performing some aspect of planning, configuring, managing, optimizing, or healing the telecommunication network in an automated fashion.

FIG. 2 illustrates an example environment including multiple SON components for a telecommunication network, the multiple SON components sharing a common API and each performing some aspect of planning, configuring, managing, optimizing, or healing the telecommunication network in an automated fashion. As described herein, in some embodiments such SON components may be used to detect network congestion within one or more portions of the frequency spectrum on which the SON 104 is operating, and to reassign and/or otherwise transition one or more users to a different portion of the frequency spectrum in response. In such embodiments, the network congestion may be caused by one or more public safety users entering and/or registering within a particular frequency range, such as the 700 MHz Band. In response, some or all non-public safety users 118 may be transitioned from the 700 MHz Band to a different frequency range. It is understood that the usage thresholds described herein are merely exemplary. In example embodiments, more than one usage threshold may be employed to transition non-public safety users 118 to different frequency ranges. For example, when a first usage threshold is satisfied, SON components may transition a first percentage or portion of non-public safety users 118 from the 700 MHz Band, or from a channel within the 700 MHz Band, to a different frequency range, frequency channel, or frequency band. In addition, when a second usage threshold greater than the first usage threshold is satisfied, SON components may transition a second percentage, second portion, or a remainder of non-public safety users 118 from the 700 MHz Band to a different frequency range.

As illustrated, one or more computing devices 202 associated with a SON telecommunication network 204 may be configured with SON tools 206 that utilize an API for SONs 208 which is common to the multiple SON tools 206. The SON tools 206 receive performance indicators 210 associated with network information via the API 208, the performance indicators 210 having been determined by a consolidation engine 212. A SON automation engine 214 executes the SON tools 106, causing the SON tools 106 to perform an action based on the performance indicators 210, such as generating updated network configurations based on the performance indicators 210 and provide the updated network configurations via the API 208 to a parameter configurator 216. The parameter configurator 216 then configures one or more network components 216 of the SON telecommunication network 204 by, for example, updating parameters of the network component(s) 218. Example network component(s) 218 may include a trouble ticket system 220, radio traces 222, core network traces 224, an OSS 226, a work order system 228, one or more other network elements 230, an alarm system 240, and/or one or more base stations 242.

In addition, the SON components illustrated in FIG. 2 include a visualization tool 232 to generate visualizations based on the performance indicators 210, a SON portal 234 to display the visualizations, to enable user collaboration regarding the SON telecommunication network 204, and to enable developer specification of SON tools 206, engineering tools 236, and a reporting engine 238. The engineering tools 236 may be invoked by SON tools 206 to participate in self-configuring, self-optimizing, or self-healing the SON telecommunication network 204. The visualization tool 232, SON portal 234, and engineering tools 236 may communicate with each other and with other SON components via the API 208.

The computing device(s) 202 may be similar to or the same as computing device(s) 102. Likewise, SON telecommunication network 204 may be similar to or the same as SON 104, with the difference that SON telecommunication network 204 is specifically identified as a telecommunication network. Network component(s) 218 may also be similar to or the same as network component(s) 116, except that specific network component(s) 220-230, 240, 242 are illustrated and identified in FIG. 2. Those network component(s) 218—a trouble ticket system 220, radio traces 222, core network traces 224, an OSS 226, a work order system 228, one or more other network elements 230, alarm system 240, and base station(s) 242—are also mentioned above with respect to network component(s) 116 as examples of network component(s) 116 that may be associated with SON 104 when SON 104 is a telecommunication network. These network component(s) 218 and other sources of network information may provide network information to the consolidation engine 212 and receive updated network configurations from the parameter configurator 216.

In some embodiments, the SON tools 206, API 208, performance indicators 210, consolidation engine 212, and parameter configurator 216 may be similar to or the same as SON tools 106, API 108, performance indicators 110, consolidation engine 112, and parameter configurator 114, and what is written above with respect to these SON components 106-114 may also apply to SON components 206-212 and 216, except as distinguished in describing FIG. 2.

In various embodiments, the visualization tool 232 may be invoked by or may query the consolidation engine 212 via the API 208, and the visualization tool 232 may receive performance indicators 210 as a result of the invoking or querying. The visualization tool 232 may receive the performance indicators 210 periodically or on an event-driven basis as a result, for example, network usage within a particular portion of the frequency spectrum satisfying a network threshold or model specified by a rule of the visualization tool 232 or the consolidation engine. For instance, the visualization tool 232 may have a rule specifying that the visualization tool 232 is to receive notification if a performance indicator 210 exceeds a certain threshold, and the consolidation engine 212 may expose, via the API 208, an alert or alarm method that the visualization tool 232 may register for. In such an instance, responsive to registration by the visualization tool 232, the visualization tool 232 may be invoked to receive an alert or alarm when the performance indicator 210 exceeds the threshold.

In some embodiments, the visualization tool 232 generates visualizations based on the performance indicators 210, alerts, or alarms. These visualizations may graphically convey information about the SON telecommunication network 204 and may be displayed to a user 118, such as on one or more of the user devices 120. In order to provide the visualizations to users, the visualization tool 232 may provide the visualizations to the SON portal 234, which may display the visualizations, or may provide them to a user device 120 for display. The SON portal 234 or user device 120 that the visualization is shared with may be a function of a configuration of the visualization tool 232.

Also, in further embodiments, the visualization tool 232 may invoke the SON automation engine 214 or a particular SON tool 206 executed by that SON automation engine 214 based on rules or user input. Such rules may direct the visualization tool 232 to invoke the SON automation engine 214 or SON tool 206 when a performance indicator 210 meets a threshold or model or when an alert or alarm is received. User input, received in response to providing a visualization, may also cause the visualization tool 232 to invoke the SON automation engine 214 or SON tool 206.

In various embodiments, the SON portal 234 may be a user-facing component for displaying information, enabling collaboration of users 118, and enabling specification by users of SON tools 206. The SON portal 234 may receive, via the API, visualizations from the visualization tool 232 and may provide those visualization to a user device 120 through, for example, web page. The SON portal 234 may also receive other network information or performance indicators 210 via the API 208 from any of the SON components, such as the consolidation engine 212 or the visualization engine 232. The SON portal 234 may also receive user input in return and may provide that user input to a SON tool 206 or to the visualization engine 232 to utilize in performing an action or in further visualizations.

The SON portal 234 may also include a collaboration engine or other social network component which enables users 118 to communicate about the SON telecommunication network 204, including discussing problems with the SON plan implemented by the SON telecommunication network 204 and suggestions for improving that plan. In some embodiments, the SON portal 234 may even enable users 118 to vote on a number of suggested improvements to the SON plan, and the improvement with the highest plurality of votes may be implemented by developers associated with the SON telecommunication network 204 specifying a new SON tool 206.

In further embodiments, the SON portal 234 enables specification of SON tools 206. The SON portal 234 may offer a user interface for textual or graphical specification of a new SON tool 206. Such a user interface may simply accept textually-specified code for a SON tool 206, or may even allow a user 118 to select graphical representations of SON components (e.g., a graphical representation of the consolidation engine 212) to cause automatic specification of code for accessing the SON component through the API 208. Also, the SON portal 234 may automatically specify or update SON tools 206 based on user comments.

In various embodiments, the SON automation engine 214 may execute any one or more of the SON tools 206 in response to being invoked through the API 208 or in response to the SON tool 206 being invoked, receiving an alarm or alert, etc. The SON automation engine 214 may handle a number of execution-related functions for SON tools 206, such as memory allocation and release, calls to system components, etc. Also, the SON automation engine 214 may receive specifications of SON tools 206 from the SON portal 234, compile those specifications if compiling is needed, and execute those SON tools 206.

The SON automation engine 214 may also provide an API 208 for SON tools 206 such that SON tools 206 utilize the API 208 of the SON automation engine 214 rather than extending the API 208 with their own method/procedures. In such an embodiment, the API 208 may be relatively stable, with each of the consolidation engine 212, visualization tool 232, SON portal 234, engineering tools 236, reporting engine 238, parameter configurator 214, and SON automation engine 214 having their own method/procedure and performance indicators/parameters. Such a relatively stable API 208 may significantly improve SON functionality.

In further embodiments, the engineering tools 236 may participate with SON tools 206 in self-configuring, self-optimizing, or self-healing the SON telecommunication network 204. The engineering tools 236 may even be SON tools themselves, operating independently and without need of execution by the SON automation engine 214. As with other SON components, the engineering tools 236 may receive or retrieve data through, and provide output to, the API 208. Example engineering tools 236 may include at least one of a performance management tool, a RF planning tool, an automatic frequency planning tool, a rehoming tool, an automatic cell planning tool, or a geolocation tool. Each engineering tool 236 may provide output used by other engineering tools 236 or by SON tools 206.

The reporting engine 238 may participate with the SON tools 206 in generating reports. The reporting engine 238 may even be a SON tool itself, operating independently and without need of execution by the SON automation engine 214. As with other SON components, the reporting engine 238 may receive or retrieve data through, and provide output to, the API 208.

In some embodiments, while the SON automation engine 214, visualization tool 232, SON portal 234, engineering tools 236, and reporting engine are illustrated in FIG. 2 in connection with a SON telecommunication network 204, the SON automation engine 214, visualization tool 232, SON portal 234, engineering tools 236, and reporting engine 238 may also be associated with other types of SONs.

Example Device

FIG. 3 illustrates a component level view of a computing device configured to implement one or more SON components. As illustrated, the computing device 300 comprises a system memory 302 storing one or more SON components 304 and other modules and data 306. Also, the computing device 300 includes processor(s) 308, a removable storage 310, a non-removable storage 312, transceivers 314, output device(s) 316, and input device(s) 318.

In various embodiments, system memory 302 is volatile (such as RAM), non-volatile (such as ROM, flash memory, etc.) or some combination of the two. The SON component(s) 304 may be any one or more of the SON tools 106, the API 108, the performance indicator store 110, the consolidation engine 112, or the parameter configurator 114 described above in detail with regard to FIG. 1. The SON component(s) 304 may also or instead be any one or more of the SON tools 206, the API 208, the performance indicator store 210, the consolidation engine 212, the SON automation engine 214, the parameter configurator 216, the visualization tool 232, the SON portal 234, or the engineering tools 236 described above in detail with regard to FIG. 2. The other modules or data 306 stored in the system memory 302 may comprise any sort of applications or platform components of the computing device 300, as well as data associated with such applications or platform components.

In some embodiments, the processor(s) 308 is a central processing unit (CPU), a graphics processing unit (GPU), or both CPU and GPU, or any other sort of processing unit.

The computing device 300 also includes additional data storage devices (removable and/or non-removable) such as, for example, magnetic disks, optical disks, or tape. Such additional storage is illustrated in FIG. 3 by removable storage 310 and non-removable storage 312. Tangible computer-readable media may include volatile and nonvolatile, removable and non-removable media implemented in any method or technology for storage of information, such as computer readable instructions, data structures, program modules, or other data. System memory 302, removable storage 310 and non-removable storage 312 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 300. Any such tangible computer-readable media may be part of the computing device 300.

In some embodiments, the transceivers 314 include any sort of transceivers known in the art. For example, transceivers 314 may include a radio transceiver that performs the function of transmitting and receiving radio frequency communications via an antenna. The transceivers 314 may facilitate wireless connectivity between the computing device 300 and various nodes of the SON 104 or SON 204. In addition, the transceivers 314 may also include a wireless communication transceiver and a near field antenna for communicating over unlicensed wireless IP networks, such as local wireless data networks and personal area networks (e.g., Bluetooth or near field communication (NFC) networks). Further, the transceivers 314 may include wired communication components, such as an Ethernet port, that connect the computing device 300 in a wired fashion to one or more nodes of the SON 104 or SON 204.

In some embodiments, the output devices 316 include any sort of output devices known in the art, such as a display (e.g., a liquid crystal display), speakers, a vibrating mechanism, or a tactile feedback mechanism. Output devices 316 also include ports for one or more peripheral devices, such as headphones, peripheral speakers, or a peripheral display.

In various embodiments, input devices 318 include any sort of input devices known in the art. For example, input devices 318 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Process

Figure 4:
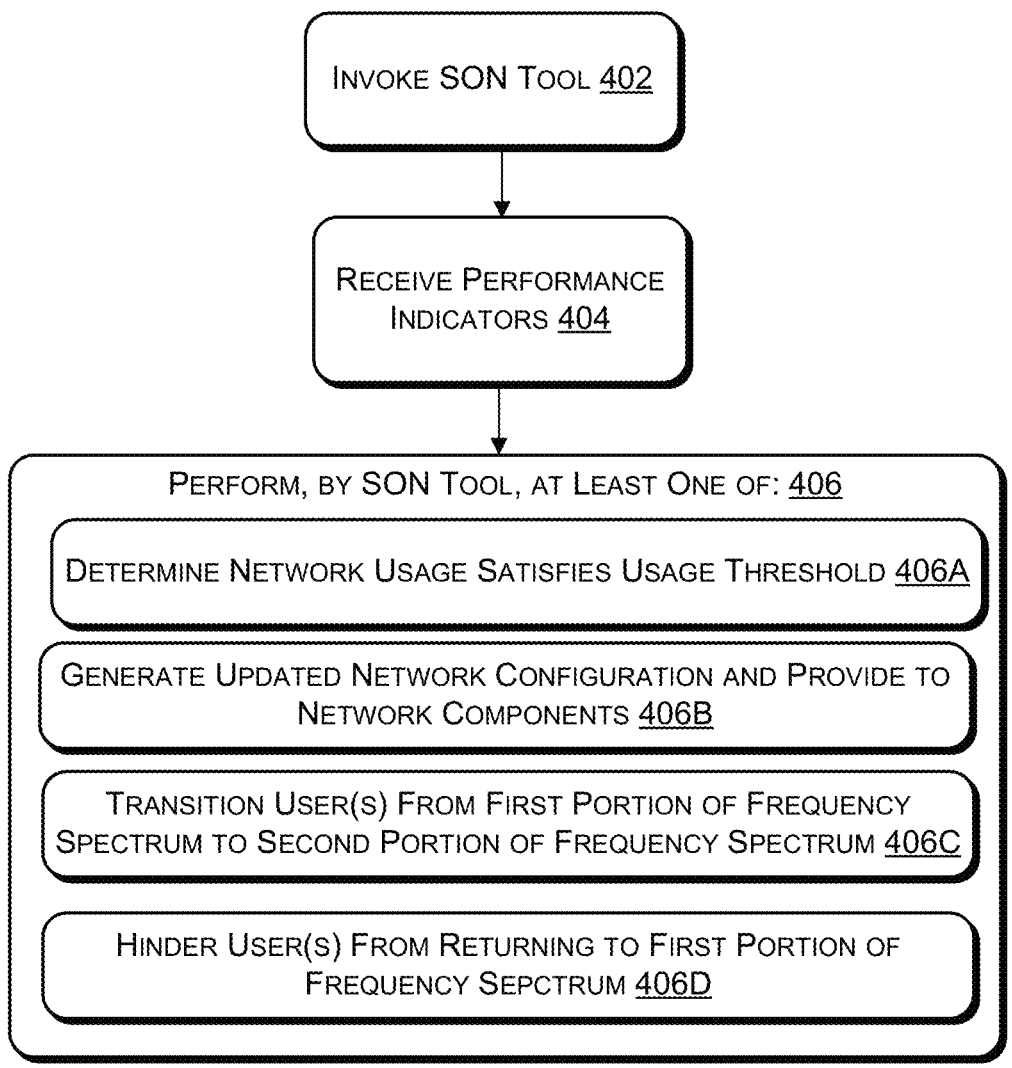
FIG. 4 illustrates an example process for receiving, by a SON tool, performance indicators and performing at least one action to ensure availability of a frequency range for public service entities based on the performance indicators.

FIG. 4 illustrates an example process. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for receiving, by a SON tool, performance indicators and performing at least one action to ensure availability of a portion of the frequency spectrum for public service entities based on the performance indicators. The process includes, at 402, the invoking of a SON tool, such as one or more of the SON tools 106 described above with respect to at least FIG. 1. Such a SON tool 106 may be invoked at 402 by one or more of a visualization tool, another SON tool, a consolidation engine, or a SON portal. In other embodiments, rather than being invoked, the SON tool may be executed continuously or periodically.

At 404, the SON tool 106 receives one more performance indicators associated with network information. In example embodiments, the performance indicators may be received via an API for SONs that is utilized by a plurality of SON tools 106. Additionally, the one or more performance indicators received by the SON tool 106 at 404 may comprise one of a power utilization, resource level, or interference level associated with the SON 104 and/or with a particular frequency range of the SON 104. Additionally, in some embodiments the network information and the one or more network components may be associated with a telecommunication network. As noted above, the network information may comprise one or more metrics indicative of network usage, and in particular, of network usage within a first portion of the frequency spectrum in which the SON 104 is operating. In an example embodiment, the first portion of the spectrum may comprise a first frequency range of a plurality of frequency ranges of the spectrum. In such embodiments, a plurality of users 118 may be registered on the SON 104 within the first frequency range, and the first frequency range may comprise the 700 MHz Band, or any other spectrum band.

At 406, the SON tool 106 performs at least one action based at least in part on the one or more performance indicators. For example, at 406A the SON tool 106 may substantially continuously monitor network usage based on, for example, the one or more network parameters. In an example embodiment, at 406A the SON tool 106 may determine, based on the one or more network parameters, that network usage within a first portion of the frequency spectrum, such as within a first frequency range of a plurality of frequency ranges, satisfies a usage threshold of the first portion of the spectrum. In such an embodiment, satisfying the usage threshold may be indicative that congestion within the first portion of the frequency spectrum has risen to an unacceptable level, and that as a result, users 118 registered within the first portion of the frequency spectrum, such as within the first frequency range, should be reassigned and/or otherwise transferred to a second portion of the frequency spectrum different from the first portion.

Such a rise in congestion may be caused by any number of factors, including an increase in the number of users 118 registered within the first portion of the frequency spectrum. In some embodiments, at 406A the SON tool 106 may receive registration of a public service user 122 in a first frequency range, and the first frequency range may comprise the 700 MHz Band. In such embodiments, receiving registration of the public service user 122 may cause an increase in network congestion and may result in network usage within the 700 MHz Band satisfying the first usage threshold. Additionally, in such embodiments, the 700 MHz Band may be a frequency range for designated for use by the public service user 122.

It is understood that in some embodiments, the usage threshold may be static and/or predetermined. Alternatively, in further embodiments the threshold may be modified based at least in part on network usage within the particular portion of the frequency spectrum. In such embodiments, the usage threshold may be modified automatically by the SON tool 106 in response to various performance indicators or network information.

At 406B, the SON tool 106 generates an updated network configuration based at least in part on the one or more performance indicators described above, and provides the updated network configuration via the API to configure one or more network components. In some embodiments, the SON tool 106 may utilizes the API to provide the updated network configuration to a base station of the SON 104.

At 406C, the SON tool 106 and/or the base station 242 may reassign and/or otherwise transition the users 118 from the first portion of the frequency spectrum to a second portion of the frequency spectrum different from the first portion. The SON tool 106 may transition the users 118 at 406C in response to, for example, determining at 406A that network usage within the first portion of the frequency spectrum satisfies the usage threshold of the first portion. In such embodiments, transitioning the users 118 at 406C may include generating the updated network configuration described above with respect to 406B. Accordingly, the updated network configuration may be invoked by the base station 242 to transition users 118 to various different portions of the spectrum to efficiently account for congestion in one or more such portions.

As noted above, in some embodiments the plurality of users 118 and/or the associated user devices 120 may be registered with, associated with, and/or otherwise characterized by one or more different classes such as a COS and/or a QOS. Such classes may comprise parameters used in data and/or voice protocols to differentiate the type of payload contained in the packet being transmitted on the network. In some embodiments, such classes may be used to prioritize the payloads and/or to assign a particular access level to user's phone call. Accordingly, in example embodiments one or more of the users 118 may be characterized by a first QOS class and a public safety user 122 may be characterized by a second QOS class different from the first QOS class. In such embodiments, the users 118 may be transitioned from a first portion of the frequency spectrum, such as a first frequency range, to a second portion of the frequency spectrum, such as a second frequency range, based at least in part on the first QOS class associated with such users 118. For example, the base station 242 may select and/or otherwise designate users 118 to be transitioned to the second frequency range, and may differentiate such users 118 from the public service users 122 currently registered in the first frequency range, based on the respective QOS classes assigned to the different users. Similar transfer methodologies may also be used to transition users 118 to different frequency channels, etc.

Once users 118 have been transitioned to the second portion of the frequency spectrum due to congestion in the first portion, it may be desirable to hinder and/or at least temporarily prohibit the users 118 from returning to the first portion. Configuring the network in this way may optimize network efficiency while, for example, the public service users 122 are registered within the first frequency range. Accordingly, at 406D, the SON tool 106 and/or the base station may hinder the plurality of users 118 from returning to the first frequency range from the second frequency range.

The SON tool 106 and/or the base station 242 may hinder the plurality of users 118 from returning to the first portion of the frequency spectrum in any number of ways. For example, at 406D the SON tool 106 and/or the base station 242 may assign and/or otherwise associate a weight with the plurality of users 118 that have been transitioned to the second portion of the frequency spectrum. In such embodiments, hindering the users 118 from returning to the first portion of the frequency spectrum may be based at least in part on the weight. For example, the updated network configuration may be invoked such that users 118 having a weight above a particular weight threshold may be at least temporarily prohibited, such as by the base station 242, from returning to the first portion of the frequency spectrum. Alternatively, such a weight may be assigned to and/or associated with the first portion, such as, via the base station 242. In such embodiments, users 118 that have been transferred from the first portion to the second portion may encounter such elevated weights when the respective user devices 120 attempt to transition back to the first portion via the base station. In response to such elevated weights, the user devices 120 may automatically attempt to register on and/or connect to a portion of the frequency spectrum different from the first portion.

In another embodiment, hindering the plurality of users 118 from returning to the first portion of the frequency spectrum at 406D may include determining an access class of the plurality of users 118, and blocking the plurality of users 118 from returning to the first portion based at least in part on the access class. For example, as noted above with regard to 406C, users 118 and/or the associated user devices 120 may be registered with, associated with, and/or otherwise characterized by one or more unique access classes utilized to assist in governing access to one or more frequency ranges of the spectrum in which the SON 104 operating. In such embodiments, the SON tool 106 and/or the base station 242 may utilize such dedicated access classes to hinder access of the respective users 118 to one or more frequency ranges. In such embodiments, for example, the SON tool 106 and/or the base station 242 may refer to an access control list stored in memory thereof, and associated with a first frequency range, in response to receiving a request from one or more of the user devices 120 for access to the first frequency range. The SON tool 106 and/or the base station 242 may deny access to the user device 120 at 406D if the access class of the respective user is included within the access control list.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more devices of a self-organizing network (SON), comprising:
   one or more processors; and
   memory communicatively coupled to the one or more processors, the memory configured to store one or more SON tools and a visualization tool,
   wherein the one or more SON tools, when operated by the one or more processors, perform operations comprising:
      receiving one or more performance indicators indicative of network usage in a first portion of a frequency spectrum in which the SON is operating, the first portion of the frequency spectrum being designated for use by a public service user while allowing use by one or more non-public service users; and determining, based on the one or more performance indicators, that network usage in the first portion of the frequency spectrum satisfies a first usage threshold of the first portion of the frequency spectrum;

wherein the visualization tool, when operated by the one or more processors in response to the one or more SON tools determining that the network usage satisfies the first usage threshold, perform operations comprising:

invoking the one or more SON tools to:
  transition the one or more non-public service users from the first portion of the frequency spectrum to a second portion of the frequency spectrum different from the first portion by generating an updated network configuration based at least in part on the one or more performance indicators and providing the updated network configuration to a base station of the SON, wherein a call session of the transitioned one or more non-public service users is maintained within the frequency spectrum during the transitioning, and
  hinder the one or more non-public service users from returning to the first portion from the second portion; and causing devices associated with the one or more non-public service users to display a notification that the one or more non-public service users have been transitioned from the first portion of the frequency spectrum to the second portion of the frequency spectrum based on the updated network configuration.

2. The one or more devices of the SON of claim 1, wherein the SON tools are further configured to receive registration of the public service user in the first portion of the spectrum, wherein receiving registration of the public service user results in network usage within the first portion satisfying the first usage threshold.

3. The one or more devices of the SON of claim 1, wherein the SON tools are further configured to associate a weight with the one or more non-public service users, wherein hindering the one or more non-public service users from returning to the first portion of the spectrum is based at least in part on the weight.

4. The one or more devices of the SON of claim 1, wherein hindering the one or more non-public service users from returning to the first portion of the spectrum includes determining an access class of the one or more non-public service users, and blocking the one or more non-public service users from returning to the first portion based at least in part on the access class.

5. The one or more devices of the SON of claim 1, wherein the first usage threshold comprises a dynamic threshold, and wherein the one or more SON tools are configured to modify the dynamic threshold based on the one or more performance indicators.

6. The one or more devices of the SON of claim 1, wherein hindering the one or more non-public service users from returning to the first portion of the frequency spectrum comprises assigning a weight to the first portion of the frequency spectrum.

7. The one or more devices of the SON of claim 1, wherein the SON tools are further configured to automatically reconfigure the base station, based on the updated network configuration, to affect transfer of the one or more non-public service users to the second portion of the frequency spectrum.

8. A computer-implemented method, comprising:

receiving, by one or more self-organizing network (SON) tools, one or more performance indicators indicative of network usage in a first portion of a frequency spectrum in which a SON is operating, the first portion of the frequency spectrum designated for use by a public service user while allowing use by one or more non-public service users;

determining, by the one or more SON tools based on the one or more performance indicators, that network usage in the first portion of the frequency spectrum satisfies a first usage threshold of the first portion; and in response to determining, by the one or more SON tools, that the network usage satisfies the first usage threshold:

invoking, by a visualization tool, the one or more SON tools to:
  generate an updated network configuration based at least in part on the one or more performance indicators and providing the updated network configuration to a base station of the SON,
  transition the one or more non-public service users from the first portion to a second portion of the frequency spectrum different from the first portion, wherein a call session of the transitioned one or more non-public service users is maintained within the frequency spectrum during the transitioning, and
  hinder the one or more non-public service users from returning to the first portion from the second portion; and displaying, by the visualization tool, on devices associated with the one or more non-public service users that the one or more non-public service users have been transitioned from the first portion of the frequency spectrum to the second portion of the frequency spectrum based on the updated network configuration.

9. The method of claim 8, wherein the SON comprises a telecommunication network, and the first portion of the frequency spectrum comprises a first frequency band.

10. The method of claim 8, further comprising modifying the threshold based at least in part on network usage within the first portion of the frequency spectrum.

11. The method of claim 8, wherein the one or more performance indicators comprise one of a power utilization, resource level, or interference level.

12. The method of claim 8, wherein the one or more non-public service users are characterized by a first QOS class and the public safety user is characterized by a second QOS class different from the first class, wherein the transitioning is based at least in part on the first class.

13. The method of claim 8, further comprising receiving registration of the public service user in the first portion of the frequency spectrum, wherein receiving registration of the public service user results in network usage within the first portion satisfying the first usage threshold.

14. The method of claim 8, further comprising associating a weight with the one or more non-public service users, wherein hindering the one or more non-public service users from returning to the first portion of the frequency spectrum is based at least in part on the weight.

15. The method of claim 8, wherein hindering the one or more non-public service users from returning to the first portion of the frequency spectrum includes determining an access class of the one or more non-public service users, and blocking the one or more non-public service users from returning to the first portion based at least in part on the access class.

16. A method associated with a self-organizing network (SON), the method comprising:

receiving, with one or more SON tools, one or more performance indicators indicative of network usage in a first portion of a frequency spectrum in which the SON is operating, the first portion of the frequency spectrum being designated for use by a public service user while allowing use by one or more other users;

determining, with one or more engineering tools of the one or more SON tools and based on the one or more performance indicators, that network usage in the first portion of the frequency spectrum satisfies a first usage threshold of the first portion; and in response to determining, by the one or more SON tools, that the network usage satisfies the first usage threshold:

generating, with the one or more engineering tools, an updated network configuration, invoking the one or more SON tools, by a visualization tool, to:

transition one or more non-public service users from the first portion of the frequency spectrum to a second portion of the frequency spectrum different from the first portion, wherein a call session of the transitioned one or more non-public service users is maintained within the frequency spectrum during the transitioning, and hinder the one or more non-public service users from returning to the first portion from the second portion; and displaying, by the visualization tool, a notification on devices associated with the one or more non-public service users that the one or more non-public service users have been transitioned from the first portion of the frequency spectrum to the second portion of the frequency spectrum based on the updated network configuration.

17. The method of claim 16, further comprising providing the updated network configuration to a base station of the SON, wherein the base station is in communication with the one or more engineering tools.

18. The method of claim 17, further comprising modifying a parameter of the base station with a parameter configurator in communication with the one or more engineering tools, wherein the hindering is based at least in part on the modified parameter.

19. The method of claim 16, further comprising receiving, with the one or more SON tools, registration of the public service user in the first portion of the frequency spectrum, wherein receiving registration of the public service user results in network usage within the first portion satisfying the first usage threshold.

20. The method of claim 16, further comprising receiving network information with a consolidation engine in communication with the one or more SON tools, and determining the one or more performance indicators based on the network information.

\* \* \* \* \*